United States Patent
Nordin (10) Patent No.: US 7,658,255 B2
(45) Date of Patent: Feb. 9, 2010

(54) DEVICE FOR PREVENTING A DRIVER UNDER THE INFLUENCE OF DRUGS TO USE A MOTOR VEHICLE

(75) Inventor: Stefan Nordin, Umeå (SE)

(73) Assignee: Trocadero Consulting AB, Umea (SE)

( * ) Notice: Subject to any disclaimer, the term of this patent is extended or adjusted under 35 U.S.C. 154(b) by 397 days.

(21) Appl. No.: 10/548,273

(22) PCT Filed: Mar. 8, 2004

(86) PCT No.: PCT/SE2004/000338

§ 371 (c)(1),
(2), (4) Date: Oct. 4, 2005

(87) PCT Pub. No.: WO2004/078511

PCT Pub. Date: Sep. 16, 2004

(65) Prior Publication Data

US 2006/0180378 A1 Aug. 17, 2006

(30) Foreign Application Priority Data

Mar. 7, 2003 (SE) .................................... 0300605

(51) Int. Cl.
*B60K 28/06* (2006.01)
(52) U.S. Cl. ...................... 180/272; 180/271
(58) Field of Classification Search ................. 180/272, 180/271
See application file for complete search history.

(56) References Cited

U.S. PATENT DOCUMENTS

| | | | | |
|---|---|---|---|---|
| 3,794,796 A | * | 2/1974 | Dwan | 200/43.11 |
| 3,796,210 A | * | 3/1974 | Hoeg | 600/543 |
| 3,815,087 A | * | 6/1974 | Hirano et al. | 180/272 |
| 3,818,434 A | * | 6/1974 | Gotoh et al. | 180/272 |
| 3,823,382 A | * | 7/1974 | Gaddy | 180/272 |
| 3,824,537 A | * | 7/1974 | Albertson | 180/272 |
| 3,855,573 A | * | 12/1974 | Honda et al. | 180/272 |
| 3,913,086 A | * | 10/1975 | Adler et al. | 340/576 |
| 3,918,176 A | * | 11/1975 | Abernethy et al. | 434/258 |
| 3,942,151 A | * | 3/1976 | Takeuchi | 180/272 |
| 4,093,945 A | * | 6/1978 | Collier et al. | 180/272 |
| 4,274,425 A | * | 6/1981 | Lutz et al. | 600/532 |
| 4,592,443 A | * | 6/1986 | Simon | 180/272 |

(Continued)

FOREIGN PATENT DOCUMENTS

DE 29622607 4/1997

(Continued)

OTHER PUBLICATIONS

International Search Report for PCT/SE2004/000338 dated Jun. 11, 2004.

*Primary Examiner*—Paul N. Dickson
*Assistant Examiner*—Barry Gooden, Jr.
(74) *Attorney, Agent, or Firm*—Nixon & Vanderhye P.C.

(57) ABSTRACT

Device intended to prevent a driver under the influence of alcohol from activating a vehicle's starting mechanism with the aid of a starter, such as an ignition key or a starter card, comprising structure for collecting specimens from the driver for analyzing the alcohol concentration in the specimen that makes it possible to activate the starting mechanism with the aid of a starter depending on a signal from the analyzing unit.

14 Claims, 5 Drawing Sheets

U.S. PATENT DOCUMENTS

| | | | | |
|---|---|---|---|---|
| 4,607,719 | A | * | 8/1986 | Rugis et al. ............... 180/272 |
| 4,613,845 | A | * | 9/1986 | Du Bois .................... 340/576 |
| 4,697,666 | A | * | 10/1987 | Collier et al. ............. 180/272 |
| 4,716,413 | A | * | 12/1987 | Haile ....................... 340/933 |
| 4,723,625 | A | * | 2/1988 | Komlos ..................... 180/272 |
| 4,738,333 | A | * | 4/1988 | Collier et al. ............. 180/272 |
| 4,749,553 | A | * | 6/1988 | Lopez et al. ................ 422/84 |
| 4,809,810 | A | * | 3/1989 | Elfman et al. ............. 180/272 |
| 4,901,058 | A | * | 2/1990 | Comeau et al. ........... 340/576 |
| 4,902,628 | A | * | 2/1990 | Blair ....................... 436/132 |
| 4,912,458 | A | * | 3/1990 | Comeau et al. ........... 340/576 |
| 4,914,038 | A | * | 4/1990 | Jewitt ...................... 436/132 |
| 4,996,161 | A | * | 2/1991 | Conners et al. ............ 436/132 |
| 5,224,566 | A | * | 7/1993 | Stepanian et al. ......... 180/272 |
| 5,531,225 | A | * | 7/1996 | Nawata et al. ............. 600/532 |
| 5,743,349 | A | * | 4/1998 | Steinberg .................. 180/272 |
| 5,969,615 | A | * | 10/1999 | Ivey et al. ................. 340/576 |
| 6,026,674 | A | * | 2/2000 | Gammenthaler ........... 73/19.01 |
| 6,075,444 | A | | 6/2000 | Sohège et al. |
| 6,167,746 | B1 | * | 1/2001 | Gammenthaler ........... 73/19.01 |
| 6,697,732 | B1 | * | 2/2004 | Gotfried .................... 701/207 |
| 6,748,792 | B1 | * | 6/2004 | Freund et al. ............. 73/23.3 |
| 6,853,956 | B2 | * | 2/2005 | Ballard et al. ............. 702/183 |
| 6,967,581 | B2 | * | 11/2005 | Karsten ..................... 340/576 |
| 2003/0183437 | A1 | * | 10/2003 | Mendoza ................... 180/272 |

FOREIGN PATENT DOCUMENTS

WO           96/32556       10/1996

\* cited by examiner

DEVICE FOR PREVENTING A DRIVER UNDER THE INFLUENCE OF DRUGS TO USE A MOTOR VEHICLE

This application is a U.S. national phase application of international application PCT/SE2004/000338 filed 8 Mar. 2004, which designated the U.S. and claims benefit of SE 0300605-3, filed 7 Mar. 2003, the entire contents of each of which are hereby incorporated by reference.

The present invention concerns a device for preventing a driver from using a motor vehicle under the influence of drugs.

The number of traffic accidents caused by drunk drivers is an increasing trend. This has put higher and new demands on equipment for preventing and exposing a driver of a motor vehicle who is under the influence of alcohol.

Supervision equipment has traditionally comprised breathalysers used by the police for stopping drivers who are under the influence of drink. This technology has many drawbacks, however: it is personnel-intensive, so only certain areas can be monitored for short periods; to gain a good effect, every vehicle must be stopped in theory and the equipment largely provides information on whether the driver is under the influence or not. Certain equipment that can be used as evidence does exist, however.

These drawbacks have driven technology development towards three different areas: preventive, impeding and informing. The equipment is also intended to be applied directly to the vehicle in a manner that is active immediately the driver intends to use the vehicle. Such equipment is known in general as a lock that is linked to the vehicle's ignition system, a so-called preventive system. The driver has to blow into a mouthpiece that is linked to some form of analysing equipment for analysing the driver's breath. If the driver's breath contains alcohol, the ignition will be prevented from starting the vehicle's engine. A time delay will prevent further attempts at starting the vehicle from being made within a certain time from the first attempt. An impeding system will allow the vehicle to be started but only be moved at a limited speed or with annoying sound and light signals. Furthermore, all start attempts are logged and the results stored in a memory for later analysis by the driver or, if the vehicle is part of a company fleet, by a company representative.

The drawback of a system described above is that the equipment must be calibrated in order to be reliable. This calibration means that the vehicle must be left to an authorised garage and will not be available while it is at one of these calibrating stations. Another drawback is that this equipment is relatively expensive. It must be retrofitted, even when purchasing a new vehicle, which means additional waiting time.

Another drawback is that if a fault occurs in the equipment and it is being used on public transport, on a bus for example, and the bus will not start, the driver will be regarded as being under the influence, which would be an infringement of the driver's integrity.

Another type of equipment, so-called informative equipment, is a system similar to that describe above but without an immobiliser. Instead, the immobiliser has been replaced with a warning, for example inside the vehicle with flashing lamps, sounds or a warning message to make the driver and/or their surroundings aware of the situation.

One object of the present invention is to provide a device for preventing or impeding a driver from using a motor vehicle when under the influence of alcohol by preventing or impeding activation of the vehicle's starting mechanism. Another object is to achieve a device that facilitates the installation and calibration of such a device. A third object is to provide a device that is cost efficient and simple to install both in new vehicles and for retrofitting in vehicles that are in service.

These objects are achieved with a device that surrounds both the vehicle's ordinary ignition key and the spare key and allows the use of either key only after the user has passed a breathalyser test. In another embodiment, the device prevents signals from being generated that can activate the starting mechanism.

The invention will be described more fully in the following with reference being made to the attached drawings, which illustrate examples of selected embodiments, where.

Figure 1:
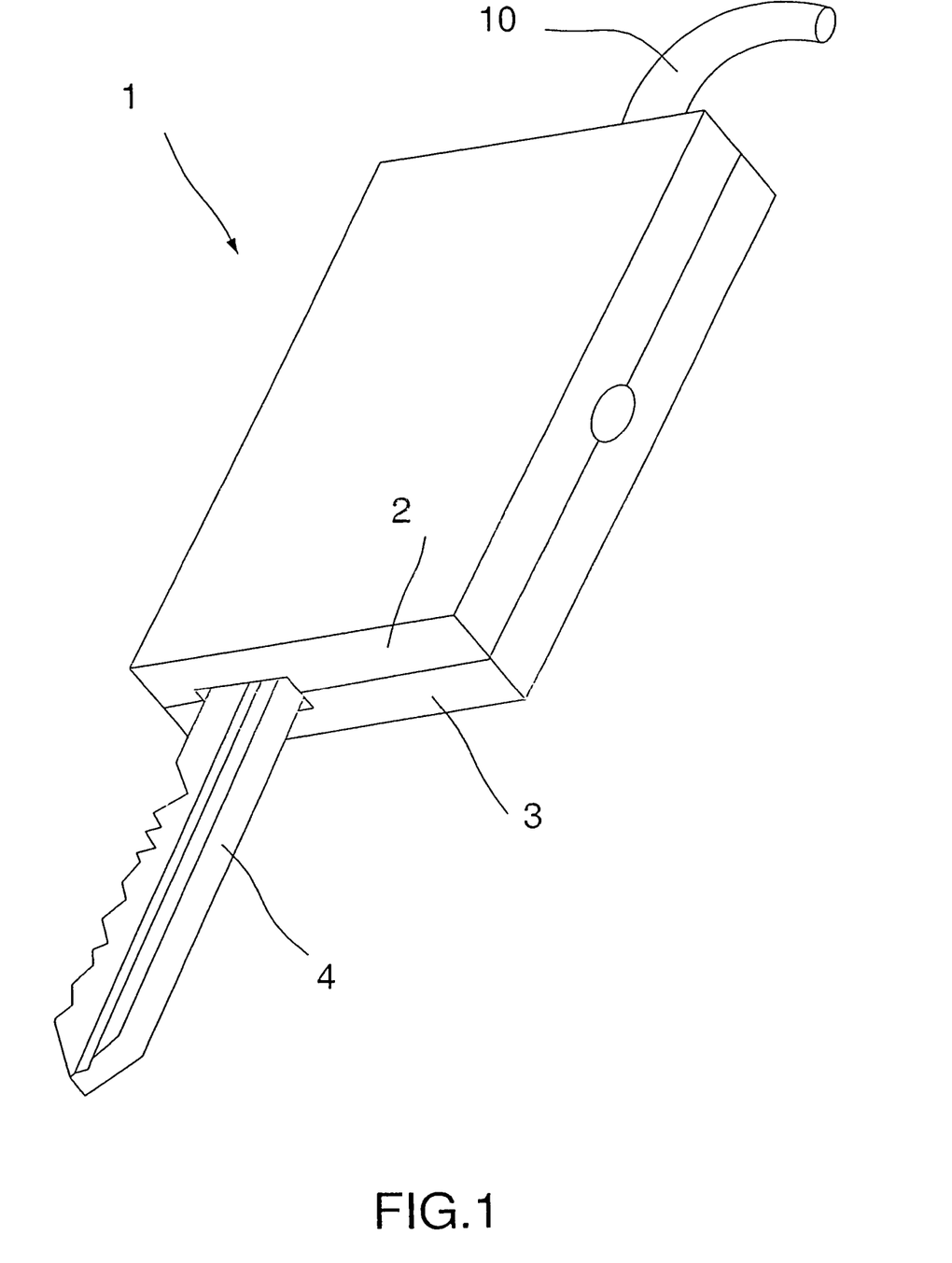
FIG. 1 shows a schematic perspective view of a starting device in the form of a key contained in a shell according to a first embodiment of the invention.
Figure 2:
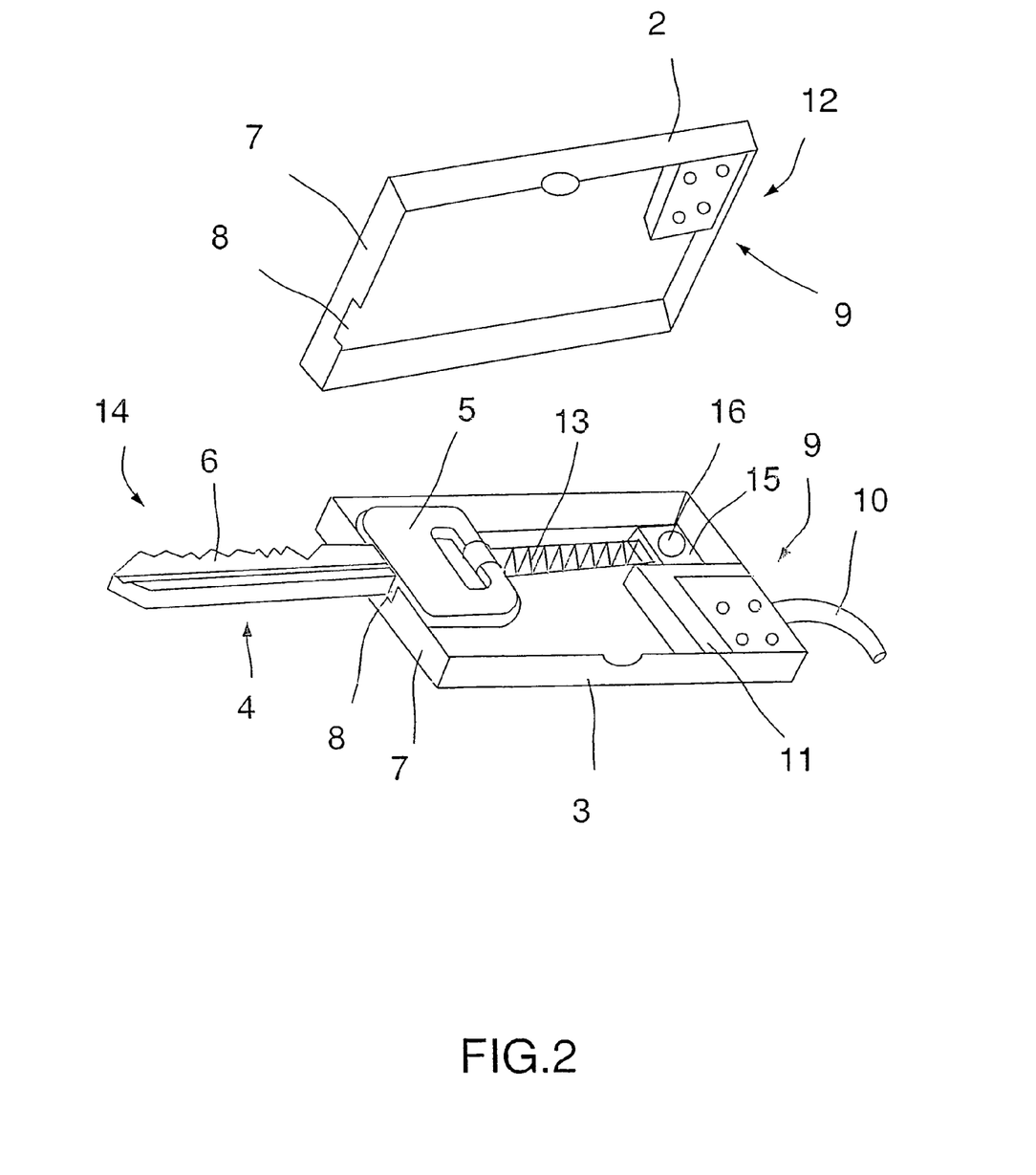
FIG. 2 shows a schematic view from FIG. 1 with the cover removed from the shell.

With reference to FIGS. 1 and 2, the device according to a first embodiment comprises a shell 1 in the form of an upper 2 and lower 3 part, which surrounds the vehicle's starting device in the form of the vehicle's ordinary ignition key 4. Parts 2 and 3 are both equipped with a bridging seal to tion that the device has been broken open. The ignition key 4 comprises a well-known key grip 5 with a blade 6 suiting the lock extending from it. The front of the shell 7 exhibits an opening 8, through which the key 4 protrudes so that only the key blade 6 comes outside the shell. The rear 9 of the shell 1 exhibits a tube 10 with mouthpiece through which a specimen of the driver's breath passes to an analysing unit 11 in the bottom part 3 of the shell 1. The analysis unit 11 determines the alcohol concentration that can be found in the breath given by the driver. It should be understood that also other drugs can be analysed, i.e. alcohol, narcotics and similar drugs.

The specimen sent to the analysis unit can also comprise a blood specimen or a specimen taken through the skin.

In another embodiment the analysis unit also registers the result and the time of the analysis. For reading the information that is collected by the analysis unit, there is a socket 12 arranged on the back of the shell 9 for connecting, for example, a computer (not shown).

According to FIGS. 1 and 2, the upper part 2 of the shell 1 comprises a guide for the ignition key and a means 13 of moving the ignition key 4 between an inner (not shown) and an outer 14 end position. The means of moving 13 comprises a spring mechanism arranged between the ignition key 4 grip 5 and an means of activation 15 arranged to the bottom part 3 of the shell 1. The means of activation 15 comprises for example an electronic bipolar relay driven by a battery 16, which may be rechargeable, which acts on the spring mechanism so that it slides the key blade 6 in or out through the opening 8. The bipolar relay comprises a transistor through which the current can be stopped or be allowed to pass depending on the direction of the current and in that way affect the spring mechanism for releasing or locking the key 4.

If the starter 4 comprises a card (not shown), the card is at least partially surrounded by the shell and the spring mechanism arranged between one edge of the card and the inside of the shell. The spring mechanism 13 has a function similar to that in a flick knife with one pressing and one pulling spring. In another embodiment, the spring mechanism can be replaced by a screw (not shown) with one end arranged to a threaded insert (not shown) and its other end pivot-mounted to the key grip. The screw is turned by a small electric motor (not shown), whereby the key is pressed out through the opening 8 as the screw moved out through the threaded insert.

The analysis unit 11 comprises a sensor element (not shown) in the form of a chamber with fuel cell. Other forms of sensor technology can be used of course, for example IR absorption or semiconductor technology. The driver's breath passes into the chamber to the fuel cell in which a chemical reaction takes place, giving a reading of a value that is proportional to the alcohol content in the breath. The said value is analysed and if the result is positive, i.e. the breath does not contain excess amounts of alcohol, i.e. an alcohol content higher than the legal limit prescribed by the country of state, a signal is sent to the means of activation 15, which releases the spring mechanism and the key is moved from its inner end position to its outer 14 end position. If the breath contains excess amounts of alcohol, i.e. a negative result is obtained from the analysis unit 11, the signal will not be sent to the means of activation 15 and the key 4 will remain in its inner end position. This means that the key blade 6 cannot be inserted into the vehicle's ignition and the car cannot be started.

If a positive response is given by the analysis unit 11, i.e. if the breath does not contain excess amounts of alcohol, the vehicle can be started and driven as intended. When the vehicle stops and the ignition key 4 is turned off, the immobiliser function will be activated again. The ignition key will be drawn automatically into its inner locked position by the spring mechanism under the influence of the bipolar relay, whereby a new test with positive result must be made before the key can be used again.

Figure 3:
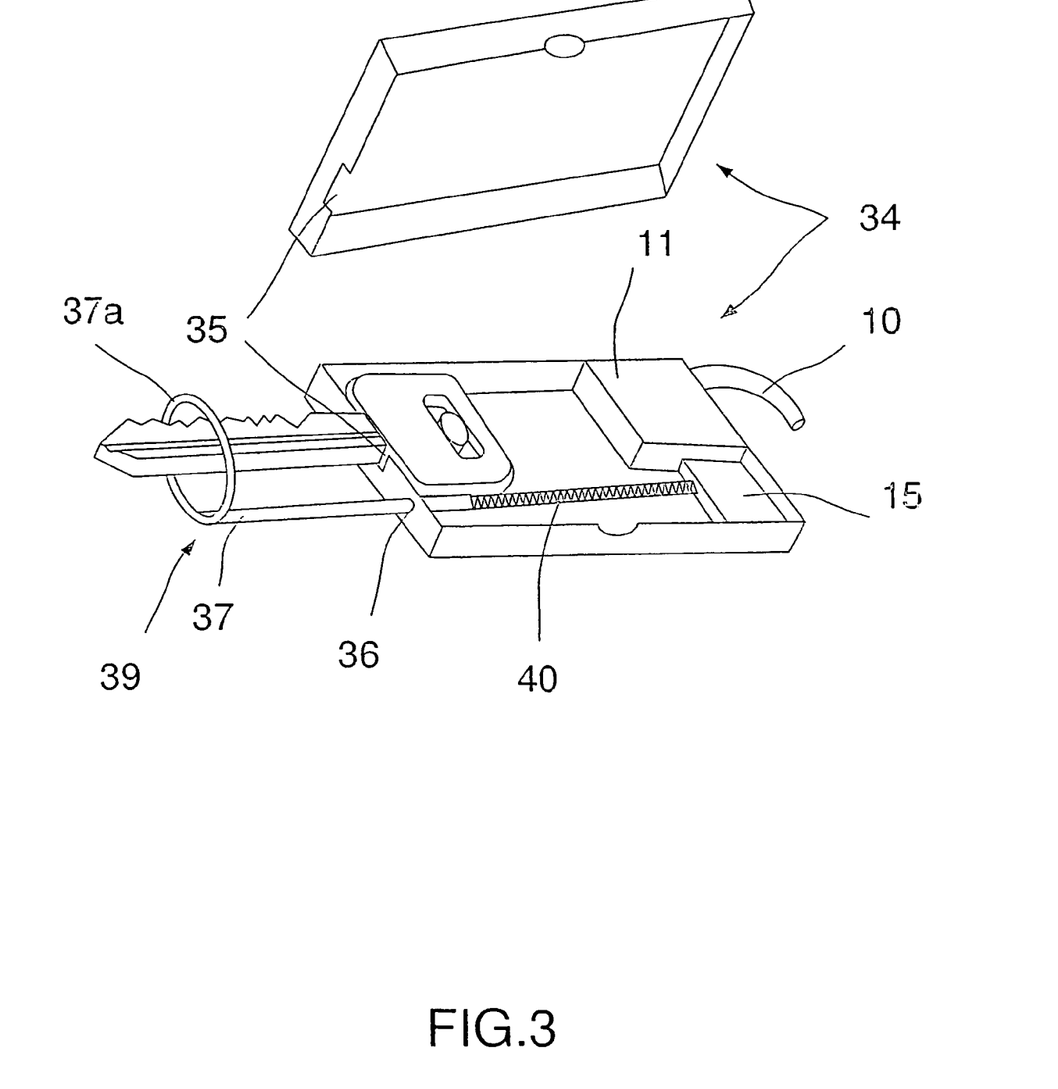
FIG. 3 shows a schematic view of a second embodiment according to the invention.

FIG. 3 shows a second embodiment according to the invention, which comprises a housing 34 surrounding and fixing the key grip of the vehicle's ordinary ignition key, the aforesaid means of activation 15 in the form of a bipolar relay, an analysis unit 11 as described above, a tube with mouthpiece 10 and a means of movement. In one side of the housing 34 is arranged a pair of openings 35, 36, through which the ignition key blade and a means of blocking extend. The means of blocking comprises at least one hardened steel pin 37 that can move between an inner and an outer 39 end position and which when being acted on by a means of movement 40 always attempts to attain its outer 39 end position. With the pin 37 in its outer 39 end position, the ignition key will be stopped from being inserted into the ignition switch, as the pin 37 will stop against the vehicle's ignition switch or dashboard when the driver attempts to insert the key into the ignition switch. After a positive analysis of the driver's breath, the bipolar relay will act on the spring mechanism 40, which is released and the pin 37 is pressed into the housing 34 when it makes contact with the dashboard or ignition switch so that the ignition key can be used. The pin 37 has a circular element 37a in the form of a hardened steel ring arranged on the tip of the pin 37 surrounding the key blade 6. The steel ring is intended to act as a sliding surface that slides on the ignition switch or dashboard when the key, after a positive response, can be inserted into the switch. This makes it easier to turn the key and prevents unnecessary wear against the ignition switch or dashboard as well as making it difficult to break the pin away from the key in order to evade the immobilization of the key.

The advantage of this embodiment is that the device has relatively small external dimensions and that the calibration of the equipment can be done by leaving one of the keys for calibration and then the other without having to take the whole vehicle to a workshop. This means the vehicle can be used while the equipment is being calibrated or repaired. The unit may well be equipped with an anti-theft device (not shown). The anti-theft device comprises an enabling function and a number of buttons with which a predetermined code can be entered by the driver before taking the breathalyser test. If the correct code is entered, the analysis unit will be activated by the enabling function and a breathalyser test can be performed. An incorrect code will cause the analysis unit to remain inactive so that the ignition key is blocked as a breathalyser test cannot be carried out. The analysis unit can also be activated using a fingerprint sensor, card reader or the like. This means the vehicle is protected against theft as well as being driven by a person under the influence of alcohol. The device can also be adapted for keys that control the vehicle's central locking system via remote control signals, whereby the original key buttons controlling the central locking functions can be used. Such an adaptation together with the aforesaid code lock, the central locking system will be activated if the correct code is keyed in and the vehicle is unlocked.

Figure 4:
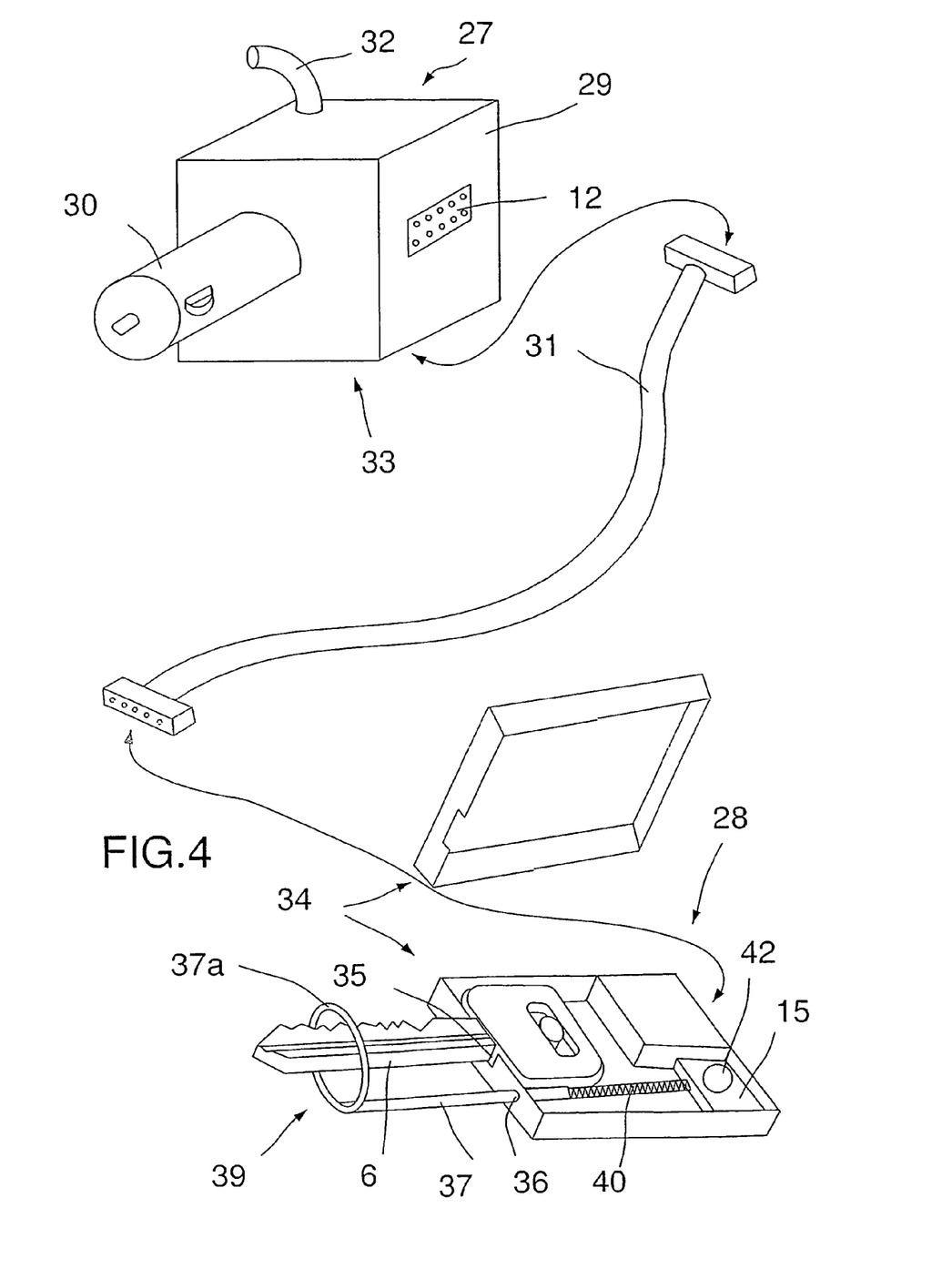
FIG. 4 shows a schematic of a third embodiment according to the invention.

According to FIG. 4, a third embodiment is shown in which the device comprises an analysis section 27 and a key section 28. The analysis section 27 comprises a shell 29, which on one side exhibits a connector 30 for a power supply adapted to cigarette lighters that are standard on vehicles. The analysis section can also be installed permanently (not shown) in the vehicle and be connected to the vehicle's electrical system. Current passes partly to the analysis section 27 for its power supply and on via a wire 31 to the key section 28. To the shell is also arranged a tube 32 with mouthpiece to lead the driver's breath into the analysis section 27 and a connector 33 for connecting to the key section wire 31.

An analysis unit and a signal generating unit (not shown) are arranged inside the analysis section shell, to which the breath sample is led and analysed. The analysis unit is designed in a similar manner to the analysis unit described above. The analysis unit can also be arranged to register the result and the time of the analysis. For reading the information that is registered by the analysis unit, there is a socket 12 arranged on the side of the shell 29 for connecting, for example, a computer (not shown).

After a positive result of the analysed breath sample, i.e. if the breath sample does not contain excess amounts of alcohol, the signal generator will generate a signal and after a negative result there will be no signal. The said signal goes via the wire 31 to the key section 28. Signal transfer between the analysis section 27 and the key section 28 can also take place via radio waves, IR or other wireless method.

The said key section comprises a housing 34 surrounding the key grip on the vehicle's ordinary ignition key, the aforesaid means of activation 15 and a means of movement. Through one side of the housing 34 is arranged a pair of openings 35, 36, through which the ignition key blade and a means of blocking extend. The means of locking comprises a hardened steep pin 37 that can move between an inner and an outer 39 end position and which when being acted on by a means of movement 40 always attempts to attain its outer 39 end position. With the pin 37 in its outer 39 end position, the ignition key will be stopped from being inserted into the ignition switch, as the pin 37 will stop against the vehicle's ignition switch or dashboard when the driver attempts to insert the key into the ignition switch. The pin 37 has a circular element 37a in the form of a hardened steel ring arranged on the tip of the pin 37 surrounding the key blade 6. The steel ring is intended to act as a sliding surface that slides on the ignition switch or dashboard when the key, after a positive response, is inserted into the switch. This makes it easier to turn the key and prevents unnecessary wear against the ignition switch or dashboard as well as making it difficult to break the pin away from the key in order to evade the immobilization of the key.

If a negative result is obtained from the analysed breath sample, no signal will be given and the key will be prevented from being used. If the signal given by the analysis unit 27 is positive, i.e. if the breath sample does not contain excess amounts of alcohol, the signal will be sent to the key section, in this example the signal passes via the wire 31 to the key section 28 and affects the means of activation 15, which activates the means of movement 40 contained in the housing 34. The means of movement 40 comprises a spring mechanism arranged between the means of activation 15 and the pin 37. The means of activation 15 comprises, as described above, an electronic bipolar relay that is driven by a battery 42 arranged in the housing. The battery is rechargeable through the wire 31 and the vehicle's electrical system. The bipolar relay acts on the spring mechanism which releases and the pin 37 is pressed into the housing 34 when it makes contact with the dashboard or ignition switch so that the ignition key is ready to use.

When the ignition key is removed from the ignition switch, the blocking function will be activated. The said pin 37 is pushed out automatically by the means of movement 40 to its blocking position, whereby a new sample of positive breath is required in order to use the key again.

The advantage with such an embodiment is that the ignition key has insignificantly larger external dimensions so it can be kept, for example, in a trouser pocket as usual. Another advantage is that during calibration and repair, the analysis unit can be removed simply from the vehicle and sent off to an authorised calibration workshop.

The separate analysis unit may well be equipped with an anti-theft device (not shown). The anti-theft device comprises an enabling function and a number of buttons with which a predetermined code can be entered by the driver before taking the breathalyser test. If the correct code is entered, the analysis unit will be activated by the enabling function and a breathalyser test can be performed. An incorrect code will cause the analysis unit to remain inactive so that the ignition key is blocked as a breathalyser test cannot be carried out. This means the vehicle is protected against theft as well as being driven by a person under the influence of alcohol. The device can also be adapted for keys that control the vehicle's central locking system via remote control signals, whereby the original key buttons controlling the central locking functions can be used. With such an adaptation together with the aforesaid code lock, the central locking system will be activated if the correct code is keyed in and the vehicle is unlocked.

Figure 5:
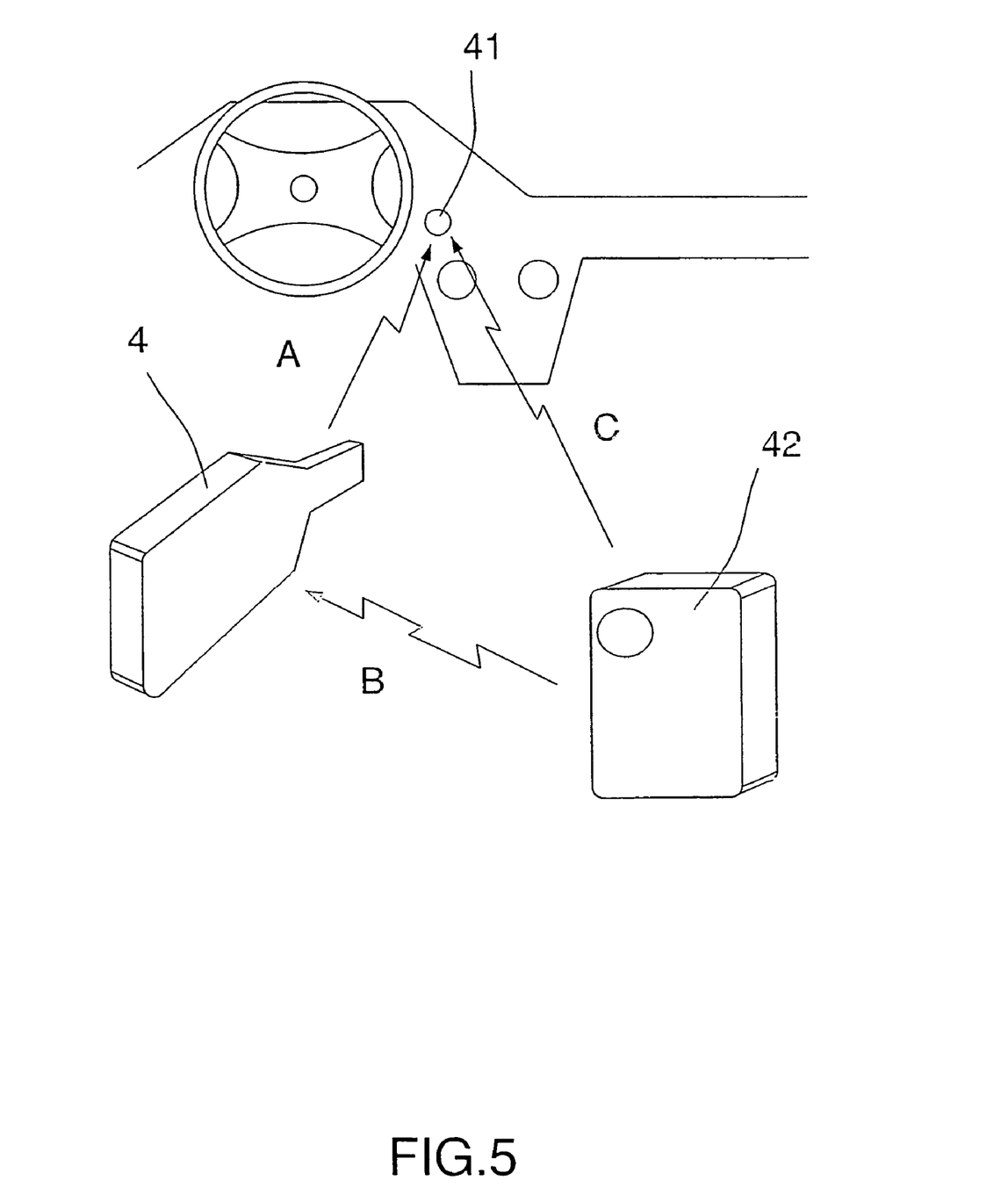
FIG. 5 shows a schematic of a further embodiment according to the invention.

Another embodiment is shown in FIG. 5 and comprises a means of starting 4 in the form of a key section with a signal generating unit 42 in the form of a transmitter integrated with a means of starting or arranged as a separate unit. The signal A, B, C, in the form of a radio wave, infrared signal or equivalent wireless signal, has a short range and is intended for reception by a signal receiver arranged in conjunction with the vehicle's starting mechanism 41, for example the ignition switch. The signal receiver is synchronised with the signal generating unit 42, i.e. the starting mechanism 41 is activated only if the correct means of starting 4 is used and an approved signal is received by the starting mechanism 41. The short range prevents the signal interfering with surrounding equipment working in the same frequency range or wavelength. When the means of starting 4 is moved towards the starting mechanism 41, signals are sent to the signal receiver. The receiver analyses the signals and if the generated signals agree with the values in the receiver, the vehicle can be started.

The signal generating unit 42 comprises an analysis unit for analysing the driver's breath. If the alcohol content in the breath specimen exceeds a certain level, for example an upper limit stipulated by the country or state, the signal generating unit in the means of starting 4 will be blocked, whereby the starting mechanism 41 will not receive the signal A, B, C that is required in order to activate the starting mechanism 41. If the breath specimen does not contain excess amounts of alcohol, a signal B will be sent from the analysing unit 42 to the means of starting, whereby a signal A will be sent from the means of starting 4 to the starting mechanism 41 and the vehicle can be started.

In another embodiment, a signal C is sent from a signal generating unit in the form of a transmitter in the analysing section and a signal A from the signal generating unit in the means of starting 4 to the starting mechanism 41 unless the breath specimen contains excess amounts of alcohol. The signals must agree with the necessary parameters in the starting mechanism signal receiver section for the starting mechanism to be activated. If the breath specimen contains excess amounts of alcohol, the signal from the analysis unit and means of starting respectively will not agree with the necessary parameters and the starting mechanism will not be activated.

The key section and or the analysis unit can also be combined with a lock, so that the user's authorization must first be verified for using the vehicle before the analysis unit and/or the means of starting can be activated. This verification can be obtained using a keypad with which a code is entered. Examples of other methods of verification are fingerprint sensors, card readers and the like. Subsequently, the driver can give a breath specimen which is analysed before the signal generating unit is activated.

It should be understood that the function can be the opposite, i.e. that the signal generating unit is located in the starting mechanism and the signal receiving section is located in the means of starting.

The present invention is not limited to the above description and as illustrated in the drawings but can be changed and modified in a number of different ways within the framework of the idea of invention specified in the following claims.

The invention claimed is:

1. Device to prevent a driver under the influence of a drug from activating a vehicle's starting mechanism with the aid of the driver's starter unit, the device comprising:
    an analyzing unit to collect at least one specimen from the driver and to analyze a drug concentration in the specimen, wherein the vehicle's starting mechanism comprises a signal receiving unit to receive one or more electronically transmitted, wireless signals from a first signal generating unit associated with the starter unit and to receive one or more electronically transmitted signals sent directly or indirectly from a second signal generating unit associated with the analyzing unit,
    wherein the vehicle's starting mechanism is prevented or impeded from activation depending on the signal from the first signal generating unit and the signal from the second signal generating unit generated when the drug concentration in the specimen is higher than a limit prescribed.

2. Device according to claim 1, whereby the first signal generating unit is activated when a signal is given by the analyzing unit.

3. Device according to claim 1, whereby signal transfer is by means of radio waves or IR light.

4. Device according to claim 1, whereby the analyzing unit comprises a code lock to activate the analyzing unit.

5. Device according to claim 1, whereby the specimen is taken from the driver's breath.

6. Device according to claim 1, whereby the drug refers to alcohol.

7. Device according to claim 1, wherein the starter unit comprises an ignition key.

8. Device according to claim 1, wherein the starter unit comprises a starter card.

9. A safety device for preventing or impeding operation of a vehicle, the safety device comprising:
   a signal generating unit to generate an electronically transmitted, wireless first signal;
   an analyzing unit to collect at least one specimen and to generate an electronically transmitted second signal in accordance with drug concentration in the specimen; and
   a signal receiving unit configured to receive or accept the first signal if the second signal indicates that the drug concentration in the specimen is less than a predetermined amount.

10. Device according to claim 9, wherein the signal generating unit includes a driver's card or key and the signal receiving unit is configured to be provided to a starting mechanism of the vehicle.

11. Device according to claim 10, wherein the starting mechanism comprises an ignition switch.

12. Device according to claim 9, wherein the analyzing unit is formed integrally with the signal generator unit.

13. Device according to claim 9, wherein the analyzing unit is operable to generate an electronically transmitted third wireless third signal and send it to the signal receiving unit if the drug concentration is less than the predetermined amount.

14. Device according to claim 9, further comprising a lock to verify authorization to use the vehicle before the analyzing unit can be activated.

* * * * *